United States Patent [19]

Siga et al.

[11] Patent Number: 4,497,670

[45] Date of Patent: Feb. 5, 1985

[54] ROTOR SHAFT AND MANUFACTURING METHOD THEREOF

[75] Inventors: Masao Siga; Seishin Kirihara; Takatoshi Yoshioka; Katsukuni Hisano; Toshimi Tan; Yoji Akutsu, all of Hitachi; Kei Kobayashi, Kitaibaraki, all of Japan

[73] Assignee: Hitachi, Ltd., Tokyo, Japan

[21] Appl. No.: 463,854

[22] Filed: Feb. 4, 1983

[30] Foreign Application Priority Data

Feb. 8, 1982 [JP] Japan .................................. 57-19508

[51] Int. Cl.$^3$ .................................................. C21D 9/28
[52] U.S. Cl. ...................................... 148/12 R; 148/36
[58] Field of Search ............. 148/36, 12 R; 75/126 C, 75/128 V, 128 W

[56] References Cited

U.S. PATENT DOCUMENTS

| | | | |
|---|---|---|---|
| 2,858,206 | 10/1958 | Boyce et al. | 75/126 C |
| 2,876,152 | 3/1959 | Jatczak | 75/126 C |
| 3,954,454 | 5/1976 | Shaw | 75/126 C |
| 4,026,727 | 5/1977 | Finkl et al. | 148/36 |
| 4,170,497 | 10/1979 | Thomas et al. | 148/36 |
| 4,193,823 | 3/1980 | Linne | 148/36 |
| 4,426,162 | 1/1984 | Tsuchiya et al. | 384/280 |

Primary Examiner—W. Stallard
Attorney, Agent, or Firm—Antonelli, Terry & Wands

[57] ABSTRACT

A rotor shaft for steam turbines has a journal portion to be supported by a bearing. The journal portion is provided with a sleeve for a bearing made of an alloy of bainite structure comprising 0.04 to 0.35% C, 0.2 to 2% Mn, less than 1% Si, 0.5 to 3% Cr, less than 5% Ni, and less than 0.5% V, having yield strength of more than 50 kg/mm$^2$ and Lt of less than 24. The sleeve is divided into two semicylindrical segments, and they are arranged on a small diameter portion of the shaft adjacent to said journal portion, welded into one piece, and subjected to stress relief treatment at a temperature higher than a temperature of tempering conducted to the sleeve before welding. The welded sleeve is fitted on the journal portion by shrink-fit so that the sleeve can be served as a superior bearing.

14 Claims, 4 Drawing Figures

ROTOR SHAFT AND MANUFACTURING METHOD THEREOF

BACKGROUND OF THE INVENTION

The present invention relates to a rotor shaft and, more particularly, to a rotor shaft having superior bearing properties suitable for use as a rotor shaft of steam turbine.

In recent years, 12% Cr alloy steel is finding a widespread use as a material for rotor shafts of steam turbines, because of its high mechanical strength and toughness at high temperature range. The 12% Cr alloy steel, however, has inferior bearing properties, particularly wear resistance property. In consequence, various accidents are often experienced such as seizure of the bearing metal in support of the rotor journal, damaging of the rotor journals and bearings and so forth, due to jamming of foreign matters such as dusts in the bearing.

To obviate this problem, Japanese Patent Laid-open Publication No. 16744/80 discloses a rotor shaft made of a 12% Cr alloy steel and having journal portions covered by a layer of a metal having good bearing properties formed by a metallizing, as well as a rotor shaft made of a 12% Cr alloy steel and having journal portions build-up welded with a weighing rod of a metal having good bearing properties.

The rotor shaft having the journal portions covered with the metal layer formed by metallizing, however, exhibits only a small affinity or bonding force between the metal layer and the base metal of the rotor. In addition, the metal layer formed by the metallizing tends to involve oxides and voids which seriously lower the tensile strength and toughness of the metal layer. In consequence, the metal layer formed by the metallizing is liable to be separated from the journal portion when a bending force is applied to the rotor shaft.

The rotor shaft having journal portions build-up by welding with a welding rod having good bearing properties also involves the following problem. Namely, in order to prevent the cracking in the build-up welded layer, it is necessary to strictly select the kind of the build-up welding metal in relation to the welding condition relating to the base metal. This sometimes imposes a difficulty in the selection of the build-up welding metal having good bearing properties. In other words, in some cases, the padding metal is selected to meet the welding condition, at the cost of a poor bearing characteristics.

In general, in the rotor shaft assembly in which a coupling is fitted by shrinkage fit to a steam turbine rotor shaft for connection to the rotor shaft of a generator, there is a fear of cracking in the rotor at the portion thereof where the coupling is attached by shrinkage fit.

Under these circumstances, there has been an increasing demand for a turbine rotor shaft having a coupling integral therewith and exhibiting a high reliability and good bearing properties.

SUMMARY OF THE INVENTION

Accordingly, an object of the invention is to provide a rotor shaft having superior bearing properties, and a manufacturing method thereof.

Another object of the invention is to provide a rotor shaft provided, on each its journal portion, with a sleeve rigidly secured thereto and having superior bearing properties and superior weldability, and a manufacturing method thereof.

Still another object of the invention is to provide a rotor shaft suitable for use as a rotor shaft of steam turbines, the rotor shaft being provided with a sleeve, formed by welding at least two segments, tightly fitted by shrink-fit, having a superior bearing properties, and being welded without cracking to present almost uniform hardness all over the area of weld and base metal portions.

Briefly stated, the invention lies in a rotor shaft provided, on the journal portion, with a sleeve formed by welding at least two segments, the sleeve being made of an alloy steel of bainite structure comprising Cr and Mo and having a weld or hot crack susceptibility Lt less than 24 (Lt<24), which value is calculated by the following equation:

$$Lt = 70(C - Si/12 - Mn/9 + 3P + 4S + Ni/23 + Cr/35 + Mo/70)$$

wherein each element such as C, Si . . . represents its content by weight percent, and at least 50 kg/mm$^2$ of yield strength.

DESCRIPTION OF THE PREFERRED EMBODIMENTS

Figure 1:
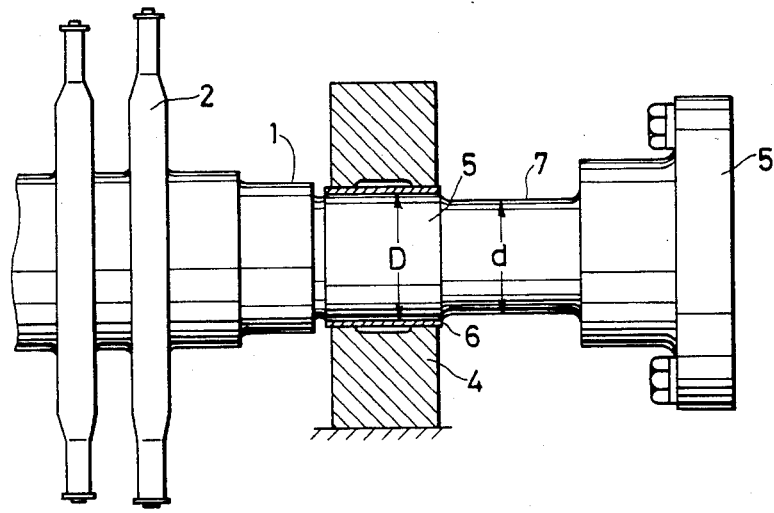
FIG. 1 is a sectional view of a rotor of a steam turbine provided with a sleeve fitted around a journal portion of the rotor shaft in accordance with an embodiment of the invention.

The sleeve material is necessary to have superior bearing properties such as high strength, sufficient hardness, sufficient wear-resistance etc., and not to be cracked by welding.

It is found by the inventors that a sleeve made of Cr-Mo alloy having the weld crack susceptibility Lt of less than 24, (more preferably less than 22) is prevented from cracking by welding, and that when a plurality of segments made of the abovementioned alloy steel for forming a sleeve are welded into the sleeve of one piece and then stress relief treatment (SR treatment) is conducted at a higher temperature than a tempering temperature of the sleeve by at least 20° C., the weld portion has substantially the same hardness as the base metal, whereby the sleeve, has superior bearing properties. According to the experiments by the inventors, when the SR treatment is conducted at a temperature lower than that of the temperring conducted after hardening the sleeve, the hardness of the weld portion and heat-influenced portion are greater than the base metal other than the abovementioned portions, the sleeve formed thus becomes uneven in hardness, which is not desirable because the journal portion provided with such a sleeve causes damage both in a bearing supporting it and in the journal portion.

The sleeve is necessary to be an alloy steel of bainite structure. The bainite structure has superior bearing properties as abovementioned. Further, the sleeve is necessary to be more than 50 kg/mm² of the yield strength at a room temperature for bearing a load of a large sized rotor shaft, particularly, for steam turbines.

Components and the contents of the sleeve alloy steel are as follows:

C is effective for increasing the strength, Addition of C more than 0.35% is easy to cause cracking upon solidifying of metal melted by welding, and when less than 0.04%, a desired strength can not be easily attained. Preferable is 0.07 to 0.15% C.

Si is added as an agent for removing acid, the content is preferable to be less than 1%, and more preferable to be 0.1 to 0.6%.

Mn is effective for preventing the sleeve from cracking by welding; addition of more than 0.2% is preferable. Addition of an excess amount of Mn elevates easily hardness at the portion heat-influenced by welding so that the bearing properties are detracted. Therefore, Mn to be added is limited within 2%. P and S exist as unavoidable impurities, the less content, the more preferable. Less than 0.03% is preferable for preventing weld crack, and more preferable, less than 0.01%.

Ni is effective for improving hardening and toughness, it is preferable to add more than 0.5% but less than 5% is preferable for preventing the sleeve from cracking which may occur when it is solidified upon welding. Addition of 1 to 3.5% is more preferable.

Cr is an element for improving hardening and bearing properties; addition of more than 0.5% is preferable. Addition of more than 3% is not effective, and an optimum range is 0.7 to 1.8%.

Mo enhances resistance of softening caused by tempering, and it also has brittleness-prevention effect. Therefore, addition of more than 0.2% is preferable for enriching a hardening effect as well as the above effects. Addition of excess amount of Mo elevates the hot crack susceptibility, therefore, addition of less than 2% is preferable. Particularly, 0.3 to 1% is preferable.

V is effective for elevating softening resistance by tempering and the strength, so that addition of it is preferable. For preventing cracks by stress relieving, it is preferable to add less than 0.5%, in particular, 0.05 to 0.3% is more preferable.

The sleeve made of an alloy mentioned above accompanies welding.

The alloy of the sleeve has the balance Fe.

For a rotor shaft, preferable is a forging steel of all martensite structure consisting essentially of, by weight, 0.1 to 0.3%C, less than 0.6% Si, 0.4 to 1.5% Mn, less than 1.2% Ni, 8 to 13%Cr, 0.5 to 1.5% Mo, 0.05 to 0.3% V, 0.02 to 0.15% Nb, 0.04 to 0.1% N and the balance Fe. A forging steel of austenite structure also is preferable consisting essentially of 0.03 to 0.1% C, less than 1% Si, less than 2% Mn, 13 to 20% Cr, 20 to 30% Ni, 0.5 to 2% Mo, 1 to 3% Ti, 0.1 to 0.5 Al, and the balance Fe.

Next, referring to FIGS. 1 and 2, a rotor shaft for steam turbines provided with the abovemention sleeve will be described hereinafter.

Figure 2:
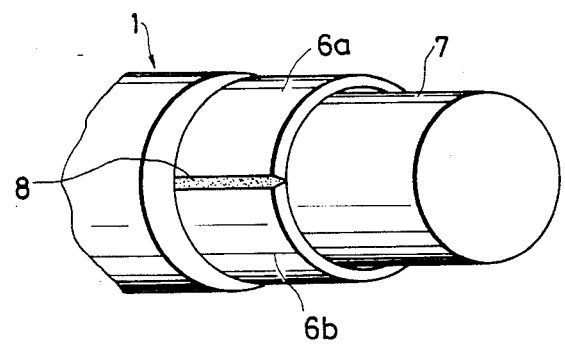
FIG. 2 is a perspective view showing the detail of the sleeve and a part of the rotor shaft in FIG. 1.

In FIG. 1, a rotor 1 made of one of abovementioned forging alloy steels has a multiplicity of stages of moving blades disposed in the axial direction of the rotor, each stage including a large number of radially arranged moving blades 2. The rotor 1 is adapted to be connected to a rotor (not shown) of a generature through a coupling 3 which is formed on one end of the rotor 1 integrally therewith. The rotor 1 is rotatably supported by a bearing 4. The portion of the rotor 1 facing the bearing 4 constitutes a journal portion 5 around which fitted is a cylindrical sleeve 6 which is made of the abovementioned alloy steel and formed by dividing it in circumferential direction into two semicylindrical segments and then welding them. The portion 7 of the rotor between the journal portion 5 and the coupling 3 has a diameter d which is several millimeter smaller than the outer diameter D of the journal portion 5. The welding 8 of two segments 6a, 6b, which is shown in FIG. 2, of the sleeve 6 is made on this rotor portion of reduced diameter 7. The cylindrical sleeve 6 thus formed is then fitted around the journal portion 5 of the rotor 1 by shrink-fit. The axial length of the sleeve is shorter than that of the reduced diameter portion 7 of the rotor 1.

The welding of the two segments to form the cylindrical sleeve 6 can be conducted by arc welding, electron beam welding, or the like.

After welding, it is preferable for the sleeve 6 to subject to SR treatment in order to relieve the remaining stress after the welding and to elevate its toughness. By the SR treatment, it is not desirable to oxidize the inner face of the sleeve 6 and the outer surface of the journal portion 5. Therefore, it is preferable to conduct the SR treatment in vacuum or in non-oxidizing atmosphere. The SR treatment is preferable to be conducted at a temperature of 570° to 670° C. and for 0.5 to 5 hr.

The shrink fit of the sleeve 6 on the journal portion 5 is conducted after the SR treatment, then the surface is cleaned.

EXAMPLE

Samples of material for the sleeve are shown in the following table wherein the composition (% by weight), crack rate on electron beam welding and various mechanical properties are shown. Example No. 2 to 4 and 8 are sleeve material according to the invention, and No. 1 and No. 5 to 7 are ones for comparison.

These samples were formed in cylindrical shape of 290 mm outer diameter, 285 mm length and 35 mm thickness by forging, after subjecting to solution. The formed samples were subjected to oil quenching treatment at 950° C. then tempering at 550° C. for 6 hours. After that, the samples were shaped in 282 mm outer diameter, 282 mm length, and 27 mm thickness by machining, and each of them is divided into two semicylindrical segments. A pair of the divided segments were joined by electron beam welding of the divided portions, then subjected to stress relieving at 630° C. for 3 hours. Then, an ultrasonic flaw detection and X-ray flaw detection were conducted to check the weld part, and weld crack length was measured. Sample pieces for tensile strength taken axially from the weld portion were subjected to tensile strength test. As a result, as shown in the table No. 1, No. 5 and No. 6 were 25.6, 27.1 and 29.8 of the weld crack susceptibility Lt, respectively, and weld crack occurred in them.

Figure 3:
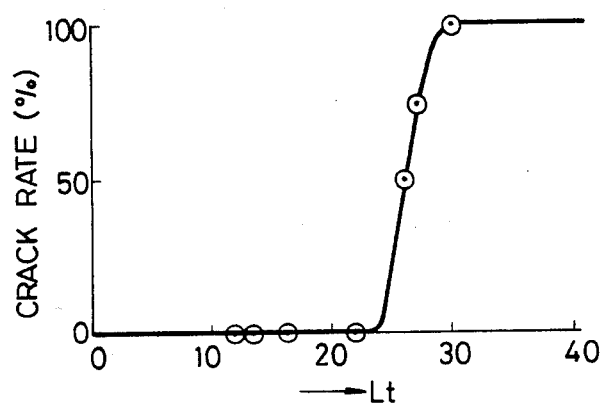
FIG. 3 is a graph showing a relation between hot crack susceptibility (Lt) and crack rate.

FIG. 3 shows relations between Lt values and weld crack occurring rate. It is noted from the FIG. 3 that weld crack occurs when the Lt value is more than 24.

TABLE

| Sample No. | Composition (%) | | | | | | | | | Lt | EBW crack rate (%) | Tensile strength (kg/mm²) | Yield strength (kg/mm²) | Elongation (%) | Drawing (%) |
| --- | --- | --- | --- | --- | --- | --- | --- | --- | --- | --- | --- | --- | --- | --- | --- |
| | C | Si | Mn | P | S | Ni | Cr | Mo | V | | | | | | |
| 1 | 0.14 | 0.31 | 0.45 | 0.011 | 0.005 | 5.11 | 0.82 | 0.20 | — | 25.6 | 51 | 77.6 | 63.1 | 17.6 | 70.8 |
| 2 | 0.10 | 0.29 | 0.41 | 0.009 | 0.006 | 3.30 | 1.60 | 0.35 | — | 16.1 | 0 | 74.5 | 59.8 | 18.1 | 71.5 |
| 3 | 0.11 | 0.30 | 0.67 | 0.012 | 0.005 | 2.10 | 0.98 | 0.38 | 0.10 | 13.4 | 0 | 71.5 | 58.8 | 17.7 | 70.8 |
| 4 | 0.13 | 0.62 | 0.71 | 0.011 | 0.007 | 1.05 | 0.95 | 0.95 | 0.08 | 10.7 | 0 | 66.7 | 53.9 | 18.9 | 75.1 |
| 5 | 0.11 | 0.32 | 0.39 | 0.025 | 0.026 | 3.31 | 1.59 | 0.37 | — | 27.1 | 75 | 74.7 | 60.1 | 17.1 | 69.6 |
| 6 | 0.35 | 0.32 | 0.43 | 0.011 | 0.006 | 1.15 | 1.07 | 0.97 | 0.23 | 29.8 | 100 | 87.0 | 70.2 | 14.8 | 59.3 |
| 7 | 0.03 | 0.28 | 0.72 | 0.012 | 0.008 | 2.05 | 1.03 | 0.32 | — | 11.1 | 0 | 59.6 | 46.5 | 25.1 | 83.7 |
| 8 | 0.13 | 0.31 | 0.45 | 0.011 | 0.005 | 4.15 | 0.83 | 0.18 | — | 22.0 | 0 | 73.8 | 57.5 | 26.1 | 76.4 |

The weld crack rate $C_R(\%)$ is calculated by the following equation;

$$C_R = \frac{\Sigma l_R}{L} \times 100$$

wherein L is weld bead length (280 mm) and $\Sigma l_R$ is total length of the welding crack.

Sample No. 7 (C=0.03%) does not reach to mechanical strength (tensile strength>65 kg, yield strength>50 kg/mm²) which is preferable for super large scale rotor shaft, particularly, the yield strength is required to be more than 50 kg/mm².

Figure 4:
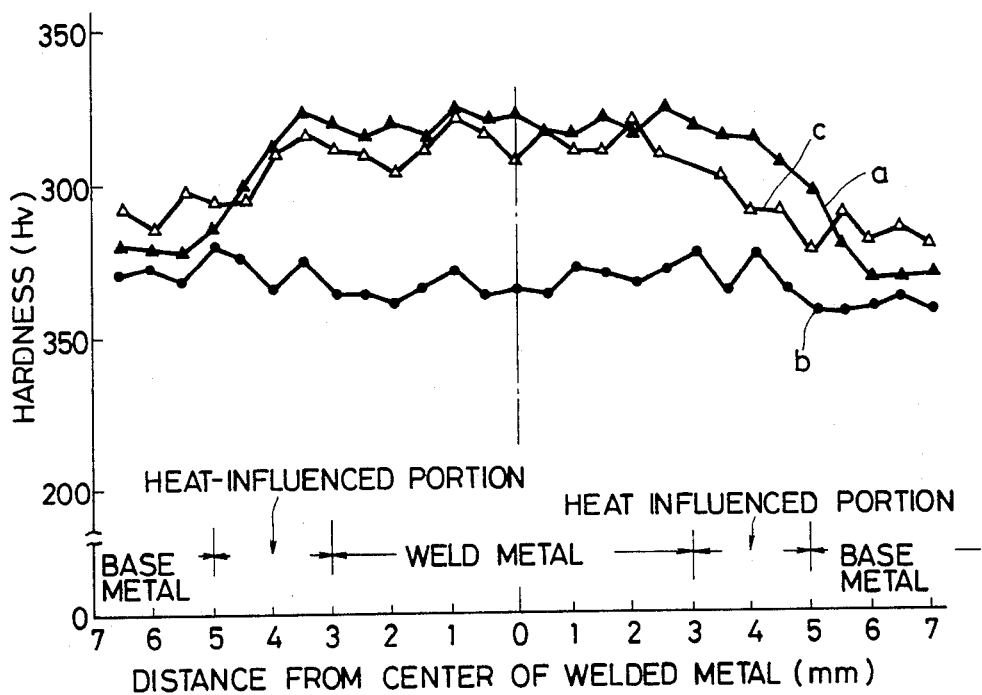
FIG. 4 is graphes showing hardness of each of welded metals at various positions from the center of the welded metal.

A part of sample No. 2 was subjected to a conventional heat treatment, that is, quenching at 950° C., tempering at 600° C., and stress relieving at 570° C. after electron beam welding (EBW), which is referred to case a hereinafter, and another part of No. 2 were subjected to quenching at 950° C., tempering at 550° C. and stress relief treatment at 610° C. after EBW, which is referred to case b. The hardness distribution of the welded portion and damage at the journal portion by high speed revolution test at 6,600 r.p.m. were examined. The revolution test was conducted under the condition that average surface pressure of the bearing was 20 kg/cm², oil including iron powders of particle diameter of 150μ was poured at rate of 50 g/20 min., and the rotation was conducted at a room temperature for 1.5 hours. FIG. 4 shows hardness distribution measurement results. The hardness was measured at half thickness of the sleeve. In the case (a) where the hardness of the weld portion is much higher than the base metal, that is, the SR treatment was conducted at a lower temperature than the tempering temperature of the sleeve, the bearing portion has damages such that roughness of the surface of the bearing metal is 100 μm, roughness of the sleeve is 11μ at the surface. In case (b) where the hardness of the weld portion is substantially the same as the base metal, that is, the SR treatment was conducted at a higher temperature than the tempering temperature, the bearing portion has such damages that surface roughness of the bearing metal is 48μ, the sleeve surface roughness is 5 μm. The latter bearing properties is excellent. The hardness of the weld portion is most suitable to be substantially the same as the base metal.

Further, another of the sample No. 2 was subjected to the SR treatment at 565° C. after quenching at 95° C., tempering at 550° C. and electron beam welding, which result is shown by a curve C. In this case also, the weld metal hardness is much higher than the base metal, which is not preferable for the sleeve.

Thus, it is found that the SR treatment is necessary to conduct at about 20° C. higher temperature than the tempering temperature.

By the abovementioned method, the sleeve segments of the sample No. 3 were welded on the reduced diameter portion 7 of the rotor 1 as shown in FIG. 1 to form a cylindrical sleeve 6, then the sleeve 6 was rigidly fitted by shrink-fit at a shrink-fit temperature of 250° to 300° C. The weld portion was inspected by the ultrasonic flaw detection and magnetic flaw detection, as a result, the weld defect was not found. Further after mirror-surface finishing of the surface of the sleeve, the bearing performance was examined. As the bearing 4 Babbit metal was used. The examination resulted in that seizure between the sleeve 6 and the bearing 4 did not occur. Therefore, superior bearing properties was attained. The rotor shaft 1 made of an alloy steel of all martensite structure consisting essentially of, by weight, 0.16% C, 0.4% Si, 0.7% Mn, 0.5% Ni, 10.8% Cr, 1.0% Mo, 0.2% V, 0.08% Nb, 0.06% N, and the balance Fe, and subjected to quenching and tempering was used.

According to the invention, there is provided a rotor shaft having superior bearing properties. The sleeve has superior bearing properties and high mechanical strength so that the sleeve can be fitted very tightly to the rotor shaft when the shrink-fit is employed.

What is claimed is:

1. A rotor shaft having at least one journal portion adapted to be supported by a bearing means, comprising a plurality of segments joined to each other by welding to form a cylindrical sleeve, said sleeve being mounted on said journal portion by a shrink-fit, each of said segments being made of an alloy steel of bainite structure comprising, by weight, 0.04 to 0.35% C, 0.2 to 2% Mn, 0.1 to 0.6% Si, 0.5 to less than 5% Ni, 0.5 to 3% Cr, 0.2 to 2%Mo, and the balance Fe, and having at least 50 kg/mm² yield strength at room temperature and a hot crack susceptibility (Lt) of less than 24, which is expressed by the following equation:

Lt=70(C−Si/12−Mn/9+3P+4S+Ni/23+Cr/35-+Mo/70), wherein each element symbol in the equation represents the content of the element in weight percent.

2. The rotor shaft as defined in claim 1, wherein said alloy steel comprises, by weight, less than 0.5% V.

3. A turbine assembly for steam turbines comprising a rotor shaft; a plurality of moving blades arranged on the circumference of the rotor shaft; a journal portion of said rotor shaft adapted to be rotatably supported by a bearing; and a cylindrical sleeve secured on said journal portion, said sleeve comprising a plurality of segments secured together by welding of abutments axially extending between the segments and each of said segments being made of an alloy steel of bainite structure consisting essentially of 0.04 to 0.35% C, 0.2 to 2% Mn, 0.1 to 0.6% Si, 0.5 to 3% CR, 0.2 to 2% Mo, 0.5 to less than 5% Ni and the balance Fe, and having a yield strength of more than 50 kg/mm² at room temperature and a weld crack susceptibility (Lt) of less than 24 which is expressed by the following equation:

$$Lt = 70(C - Si/12 - Mn/9 + 3P + 4S + Ni/23 + Cr/35 + Mo/70),$$

wherein each element symbol in said equation represents the content of the element in weight percent.

4. The assembly as defined in claim 3, wherein in said alloy steel, each of S and P is less than 0.03%.

5. The assembly as defined in claim 4, wherein said segments forming said sleeve are semicylindrical, said sleeve being fitted on said journal portion by a shrink-fit.

6. The assembly as defined in claim 5, further comprising a coupling integral with said rotor shaft at an end portion thereof, and said rotor shaft having a small diameter portion less in diameter than that of said journal portion located between said journal portion and said coupling.

7. The assembly as defined in claim 6, wherein said sleeve after being welded is subjected to stress relief treatment at a temperature more than 20° C. higher than that of heat treatment applied to said sleeve during tempering, and then shrink-fitted on said journal portion.

8. The assembly as defined in claim 7, wherein said sleeve consists essentially of 0.07 to 0.15% C, 0.1 to 0.6% Si, 0.2 to 2% Mn, 1 to 3.5% Ni, 0.7 to 1.8% CR, 0.3 to 1% Mo, 0.05 to 0.3 V, and balance Fe, and has a Lt of less than 22.

9. The assembly as defined in claim 8, wherein each of P and S is less than 0.01%.

10. The assembly as defined in claim 9, wherein said rotor shaft has a body portion that is an alloy steel having all martensite structure and consists essentially of, by weight, 0.1 to 0.3% Co, less than 0.6% Si, 0.4 to 1.5% Mn, less than 1.2% Ni, 8 to 13% Cr, 0.5 to 1.5% Mo, 0.05 to 0.3% V, 0.02 to 0.15% Nb, 0.04 to 0.1% N, and the balance Fe.

11. The assembly as defined in claim 3, wherein said alloy steel further includes less than 0.5% by weight of V.

12. A method of manufacturing a rotor shaft, comprising:
providing a rotor shaft body adapted for use in a steam turbine and having at least a journal portion and an adjacent small diameter portion;
forming a cylindrical member for a sleeve made of an alloy steel of bainite structure comprising 0.04 to 0.35% C, 0.2 to 2% Mn, 0.1 to 0.6% Si, 0.5 to 3% Cr, 0.2 to 2% Mo, 0.5 to less than 5% Ni, and the balance Fe, and having a yield strength of more than 50 kg/mm$^2$ at room temperature and a hot crack susceptibility Lt of less than 24, the Lt being calculated according to the following equation:

$$Lt = 70(C - Si/12 - Mn/9 + 3P + 4S + Ni/23 + Cr/30 + Mo/70),$$

wherein each element symbol in said equation represents the content of the element in weight percent;
subjecting said member to heat treatment including hardening and tempering;
dividing said member axially into a plurality of segments;
forming a cylindrical sleeve by arranging said segments on said small diameter portion of said shaft and welding the segments to each other;
subjecting said sleeve to stress relief treatment at a temperature higher than the temperature during said tempering treatment by at least 20° C.; and
fitting said sleeve on said journal portion by a shrink-fit.

13. The method as defined in claim 12, wherein P and S in said alloy steel are less than 0.03% by weight, said alloy steel further comprises, by weight, less than 0.5% V.

14. The assembly as defined in claim 7, wherein said alloy steel consists essentially of 0.07 to 0.15% C, 0.1 to 0.6% Si, 0.2 to 2% Mn, 0.5 to less than 5% Ni, 0.7 to 1.8% Cr, 0.3 to 1% Mo, and the balance Fe.

* * * * *